(12) United States Patent
Peden et al.

(10) Patent No.: US 7,602,508 B1
(45) Date of Patent: Oct. 13, 2009

(54) METHOD AND APPARATUS FOR MEASURING PITCH, RAKE AND SQUARENESS OF A BOAT PROPELLER

(75) Inventors: Hoyt Peden, Iuka, MS (US); Kerry L. Peden, Fulton, MS (US)

(73) Assignee: Propstraightener.com, LLC, Iuka, MI (US)

( * ) Notice: Subject to any disclaimer, the term of this patent is extended or adjusted under 35 U.S.C. 154(b) by 476 days.

(21) Appl. No.: 11/278,257

(22) Filed: Mar. 31, 2006

Related U.S. Application Data (60) Provisional application No. 60/667,146, filed on Mar. 31, 2005.

(51) Int. Cl.
*G01B 11/14* (2006.01)
(52) U.S. Cl. .................. 356/614; 356/600; 356/624; 356/613
(58) Field of Classification Search ......... 356/625–640, 356/601, 613
See application file for complete search history.

(56) References Cited

U.S. PATENT DOCUMENTS

| | | | |
|---|---|---|---|
| 4,411,073 A | 10/1983 | Ryan | |
| 4,632,636 A | 12/1986 | Smith | |
| 5,521,707 A * | 5/1996 | Castore et al. | 356/394 |
| 6,532,678 B2 * | 3/2003 | Morgan | 33/530 |
| 2007/0247639 A1 * | 10/2007 | Amstel et al. | 356/625 |

OTHER PUBLICATIONS

Advanced Technology Electronic 3D Propeller Inspector and Analysis System, http://www.halepropeller.com/MRI.html, 1999.
Prop Scan Marine Propeller Technology, www.propscan.com, 1997.
Outboard Propeller Manufacturers and Propeller Information Center, http://www.virtualpet.com/otcc/rigging/props/props.htm, 1st edition, (Jun. 11, 2001).

* cited by examiner

*Primary Examiner*—Gregory J Toatley, Jr.
*Assistant Examiner*—Iyabo S Alli
(74) *Attorney, Agent, or Firm*—Garvey, Smith, Nehrbass & North, L.L.C.; Charles C. Garvey, Jr.

(57) ABSTRACT

The present invention provides a method of determining certain propeller parameters for a boat propeller that has a hub, a central axis and a plurality of propeller blades attached to the hub. The method includes providing a laser displacement sensor in proximity to the propeller. The laser displacement sensor has a laser head that generates a laser beam. The laser displacement sensor is used to measure the distance from the laser head to the propeller. The laser head is moved and the laser again measures the distance from the laser head to the propeller after the laser head is moved in relation to the propeller. The movement can be along either or both of the two axes including a first axis that is a linear axis and a second axis that is curved. The method includes computing a selected parameter or parameters by using the measurements that are obtained, the parameters being selected from a group that includes pitch, rake and squareness.

22 Claims, 11 Drawing Sheets

METHOD AND APPARATUS FOR MEASURING PITCH, RAKE AND SQUARENESS OF A BOAT PROPELLER

CROSS-REFERENCE TO RELATED APPLICATIONS

Priority of U.S. Provisional Patent Application Ser. No. 60/667,146, filed Mar. 31, 2005, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to a method and apparatus of measuring selected parameters relating to a boat propeller. More particularly, the present invention relates to an apparatus and method that measures the pitch, rake and squareness of a boat propeller.

2. General Background of the Invention

The present invention provides a method and apparatus that reads the pitch, rake and squareness of a boat propeller and lays out a pattern for boat propellers. It can be a self-contained unit as well as or mount to a propeller straightening machine. Servo motors can be used to propel it. It actually reads the pitch, rake and blade squareness with a laser. The apparatus can be controlled using a computer.

BRIEF SUMMARY OF THE INVENTION

The present invention provides a method of determining propeller parameters for a boat propeller that has a hub, a central axis and a plurality of propeller blades attached to the hub.

The method includes providing a laser displacement sensor in close proximity to the propeller. The laser displacement sensor is used to measure the distance from the laser head to the propeller. The laser head is moved and the laser displacement sensor again measures the distance from the laser head to the propeller after the laser head is moved in relation to the propeller along either or both of the two axes including a first axis that is a linear axis and a second axis that is curved.

The method includes computing a selected parameter or parameters by using the measurements that are obtained, the parameters being selected from a group that includes pitch, rake and squareness.

The method of the present invention provides a method and apparatus to measure the pitch, rake and squareness of a boat propeller. The method of the present invention uses a laser to measure the distance from a laser head to the propeller. The laser head is moved on two axes, which can be computer controlled, driven by servo motors, for example. One axis moves from the center of the propeller outwardly. This axis will move the laser head out to a controlled circumference setting. The other axis will rotate the laser head 360° around the propeller central axis.

The method of the present invention provides a laser scan that is controlled by a computer. Controlling software can be prepared using Microsoft® Visual Basic software. A display can be provided to display company information such as company name, address and logo.

The data will include the measured pitch of the propeller. The pitch is defined as the distance the propeller will move in one complete revolution and is displayed in inches.

The data also will include the measured rake of the propeller. The rake is defined as the amount the blade is bent in relation to the hub and is displayed in degrees.

The data will also include the squareness of the propeller. The squareness is defined, as the distance the blades are separated and is displayed in degrees. A screen will also display a graph representing the measured blade parameters, including all of the measurements listed above.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE PREFERRED EMBODIMENT

FIGS. 1-4 show the preferred embodiment of the apparatus of the present invention designated generally by the numeral 10. Propeller measuring system 10 is shown in FIGS. 1-4 measuring a propeller 11 that has a hub 12 and a plurality of blades 13, 14, 15, 16.

In most cases, a propeller 11 being measured is a damaged propeller. Assume that a 24" diameter propeller with 24 pitch has one blade that is damaged. If the blade is damaged, its pitch could vary. The blade may be damaged so that it gives pitch readings of 21, 22 and 23 at different locations on the blade and at a given radii (e.g. 50% radius or 6" from the hub). After the blade is measured, this damage is quantified, making repair easier. During the repair process, a user can check the propeller parameters from time to time until the propeller has been restored to its as manufactured dimensions, pitch, rake, squareness. Further, the damaged blade may not be squared with the other blades. On a four blade propeller, squareness is correct if the blades are exactly ninety degrees (90°) apart. The damaged blade may be eighty eight degrees (88°) from the blade closest to it.

In order to measure a propeller 11, the hub 12 is mounted upon support 17. The support 17 provides a conical outer surface 18 that is receptive of the hub 12 of the propeller. Support 17 also provides a conical socket 19 that is receptive of shaft 21 of measuring apparatus 20. The vertical shaft 21 provides a conical outer surface 22 that mates with a correspondingly shaped conical socket 19 of support 17 or removal therefrom.

Figure 1:
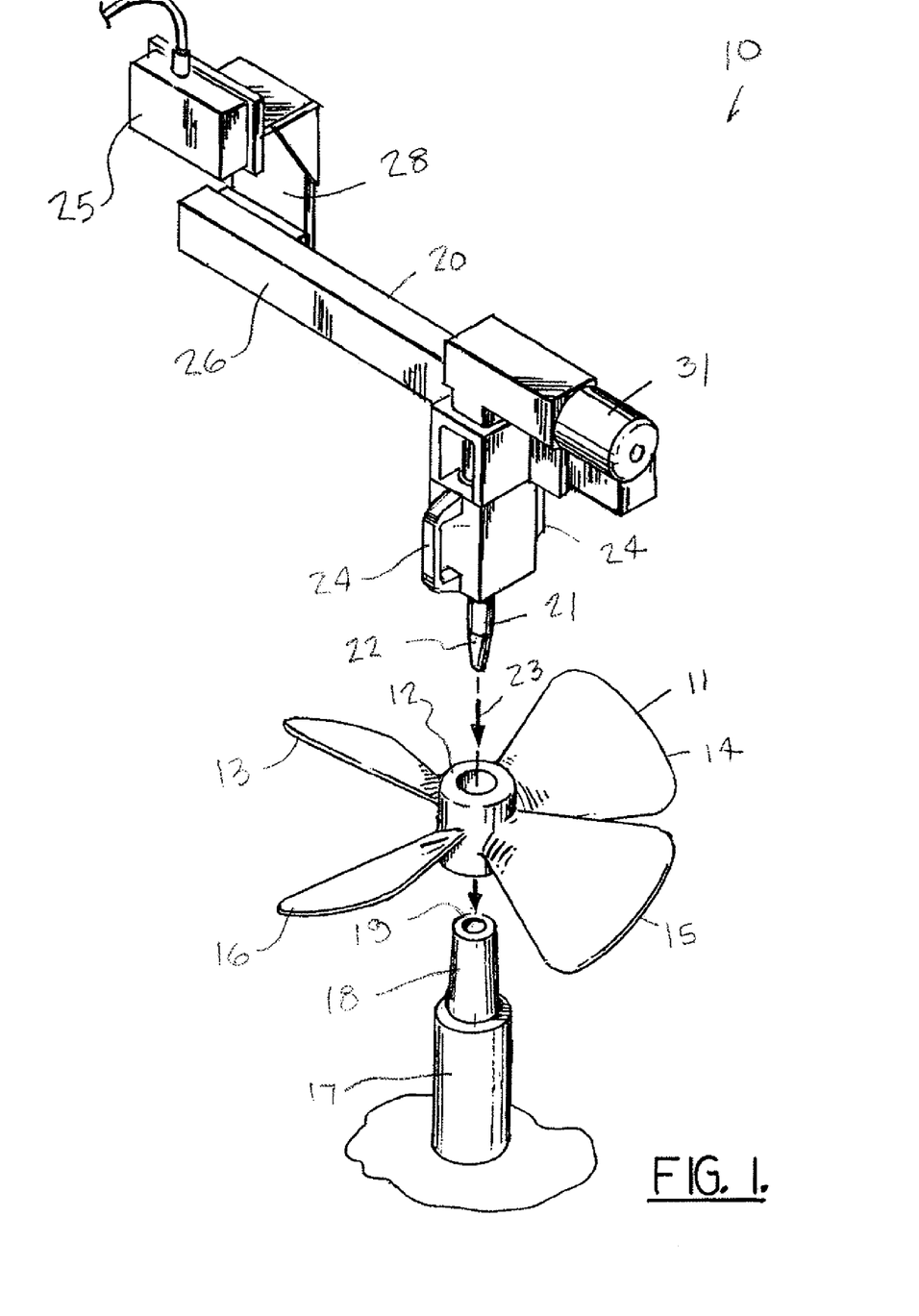
FIG. 1 is a perspective view of the preferred embodiment of the apparatus of the present invention.

The assembly of the apparatus 20 to support 17 is indicated schematically by arrow 23 in FIG. 1. Handles 24 can be provided for lifting and manipulating apparatus 20 during such placement upon support 17.

The apparatus 20 carries a laser displacement sensor 25. Sensor 25 is a commercially available device, sold by Micro-Epsilon (www.micro-epsilon.com). The sensor 25 can be a 1750-500CCD laser displacement sensor, 500 mm range (for example model no. OPTONCDT1700). Such a sensor operates according to the triangulation principle. A laser diode projects a visible spot of light through an optical receiving system onto a positive sensitive element (CCD array). If the target changes its distance to the sensor, this leads to a change of the imaging spot on the CCD array. The position of the spot incident on the CCD array is evaluated. The laser takes about 40,000 samples in a 360 degree sweep of the propeller 11. This laser sensor 25 is used to measure the distance between the laser 25 and the propeller 11 blade 13, 14, 15, or 16. The laser 25 puts out an analog signal that is proportional to that distance. The analog signal is then applied to a driver (e.g. National Instruments driver used with Microsoft® Visual Basic software such as model number N.I.NIDAQVER). This driver enables data retrieved from laser sensor 25 using Microsoft® Visual Basic software. The data is entered into a computer via the drivers and Microsoft® Visual Basic software.

Figure 3:
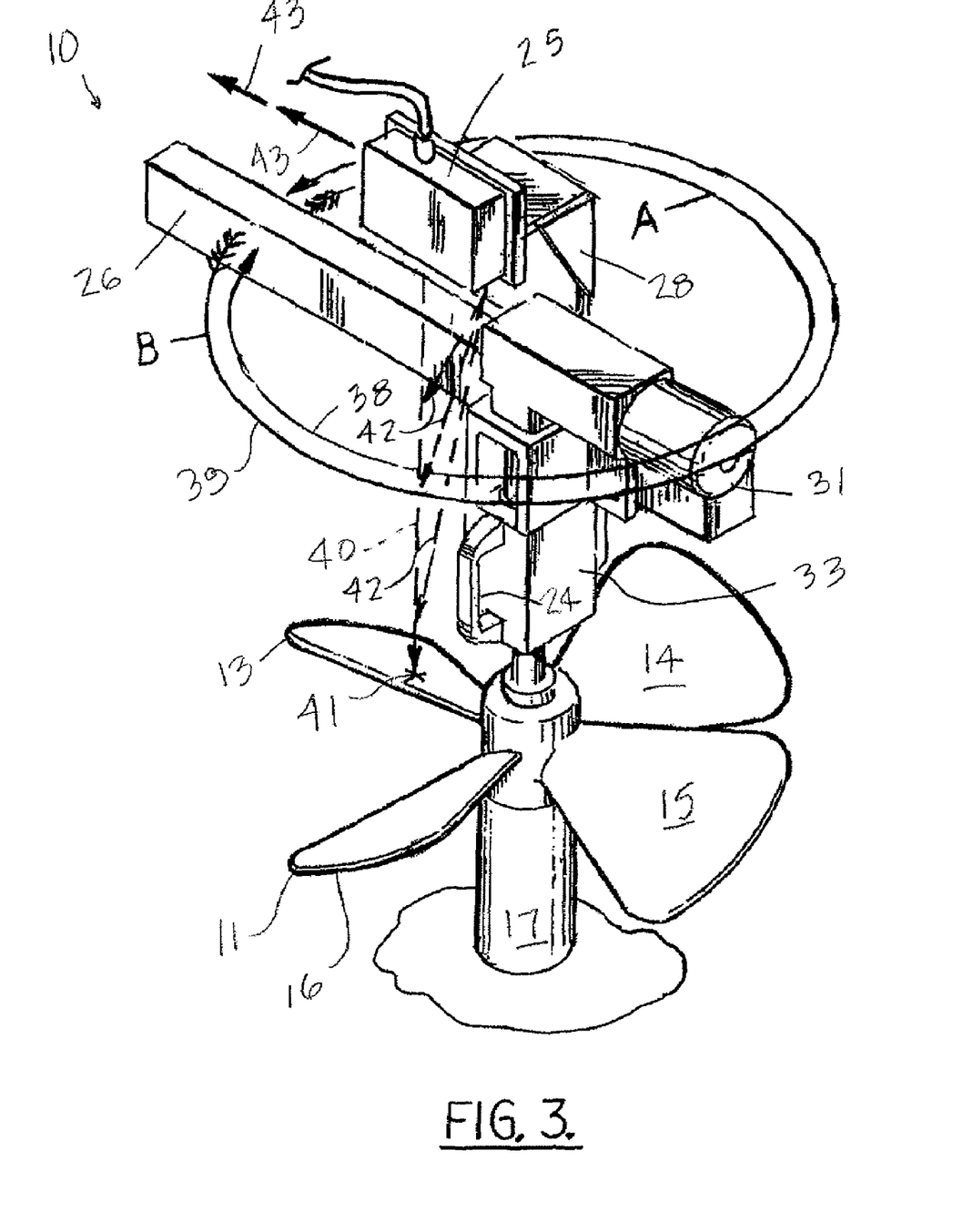
FIG. 3 is a schematic perspective view of the preferred embodiment of the apparatus of the present invention illustrating a tracking of a laser relative to the propeller to be measured.
Figure 4:
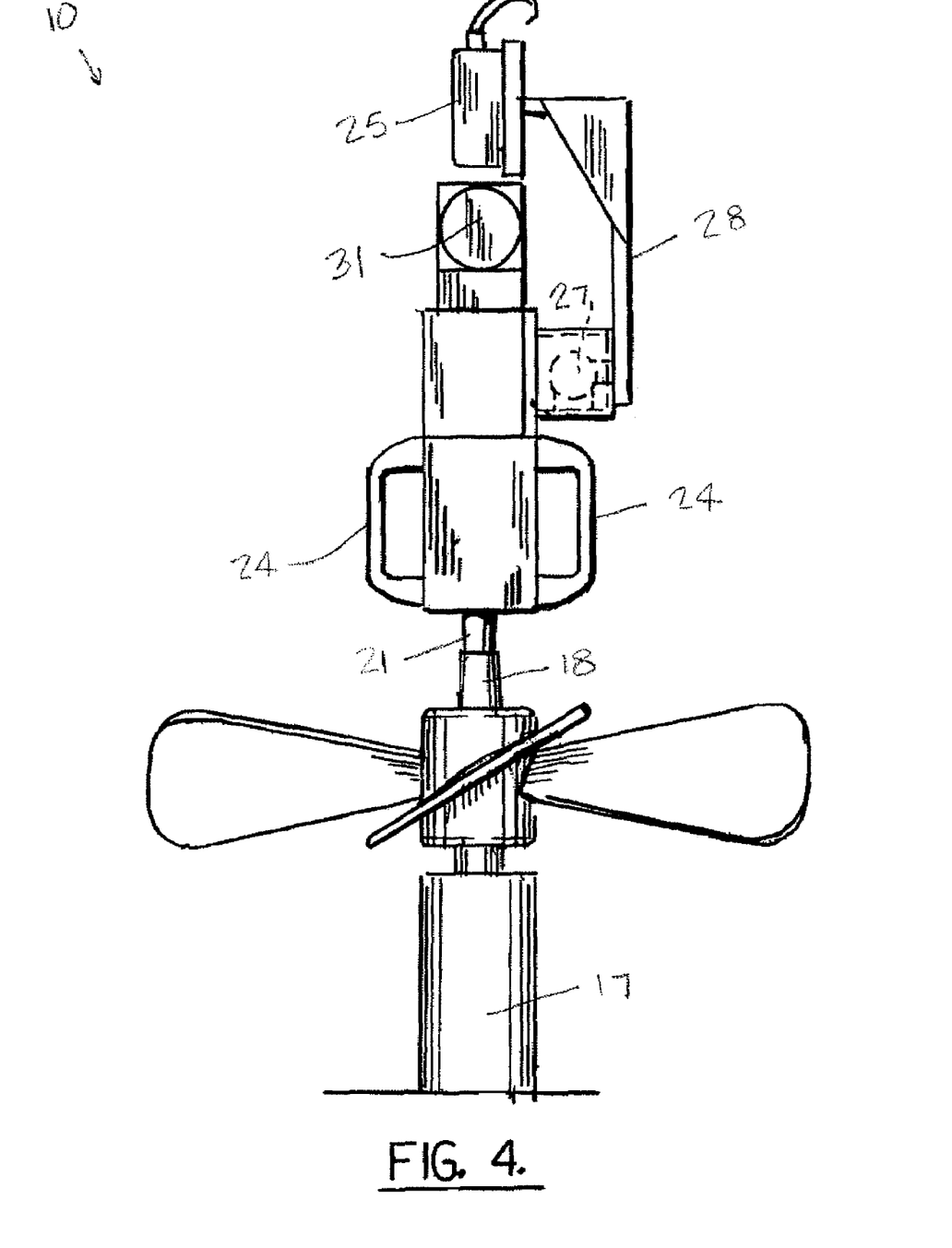
FIG. 4 is a elevation view of the preferred embodiment of the apparatus of the present invention taken along lines 4-4 of FIG. 2.

In FIG. 3, beam 41 is shown emitted by sensor 25 and striking propeller 11 at blade 13.

Apparatus 20 has a slide 26 that carries bracket 28. Slide 26 can be obtained from IAI actuator (www.intelligentactuator.com), for example their part number DS-SS6-1-30-3-400-C1-N. Slide 26 is supplied with Microsoft® Visual Basic drivers that enable control of motor 27 and data retrieval from the motor 27. The bracket 28 supports laser displacement sensor 25. Motor drive 27 can be used to move the bracket 28 and its laser displacement sensor 25 to a selected position upon slide 26 as indicated schematically by arrows 43 in FIG. 3.

Figure 2:
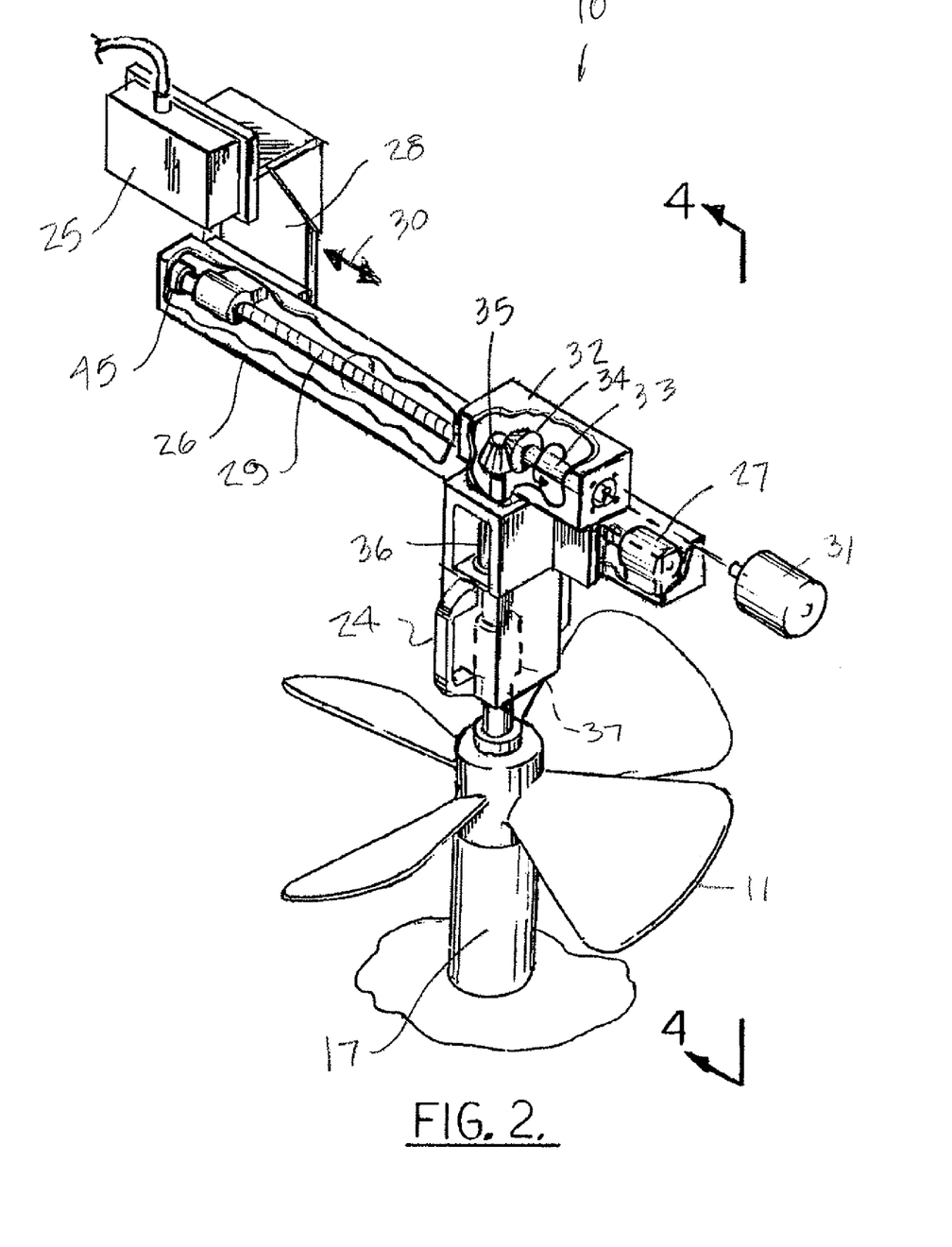
FIG. 2 is a partially cutaway perspective view of the preferred embodiment of the apparatus of the present invention.

Motor drive 27 engages a threaded shaft 29. The shaft 29 engages internally threaded sleeve 44 that mounts to slide bracket 28 as shown in FIG. 2. A bearing 45 supports an end of shaft 29 opposite motor drive 27. Arrow 30 in FIG. 2 illustrates the ability of bracket 27 to be moved to a selected position upon slide 26. Thus, rotation of motor drive 27 rotates shaft 29, moving bracket 28 and sensor 25.

A second motor drive 31 is provided for rotating the slide 26 and thus slide bracket 28 and laser displacement sensor 25 through a circle or arc (e.g. 360 degrees) relative to propeller 11. Motor drive 31 is coupled to a right angle gear box 32 providing drive shaft 33, bevel gears 34, 35 and vertical shaft 36. A bearing 37 (e.g. ball bearings) can be used to support rotary movement of arm 26 relative to propeller 11. The bearing 37 can be contained within a protective housing. The motor drives 27, 31 are commercially available from Animatics Corporation, 3050 Tasman Drive, Santa Clara, Calif. 95054 (www.smartmotor.com) The motor 31 can for example be Animatics Smartmotor® model SM2337DT. This product is supplied with Microsoft® Visual Basic drivers that enable operation and control of motor 31 and data retrieval from the motor by use of Microsoft® Visual Basic software. Motor 31 rotates the laser sensor 25 three hundred sixty degrees (360°).

Figure 11:
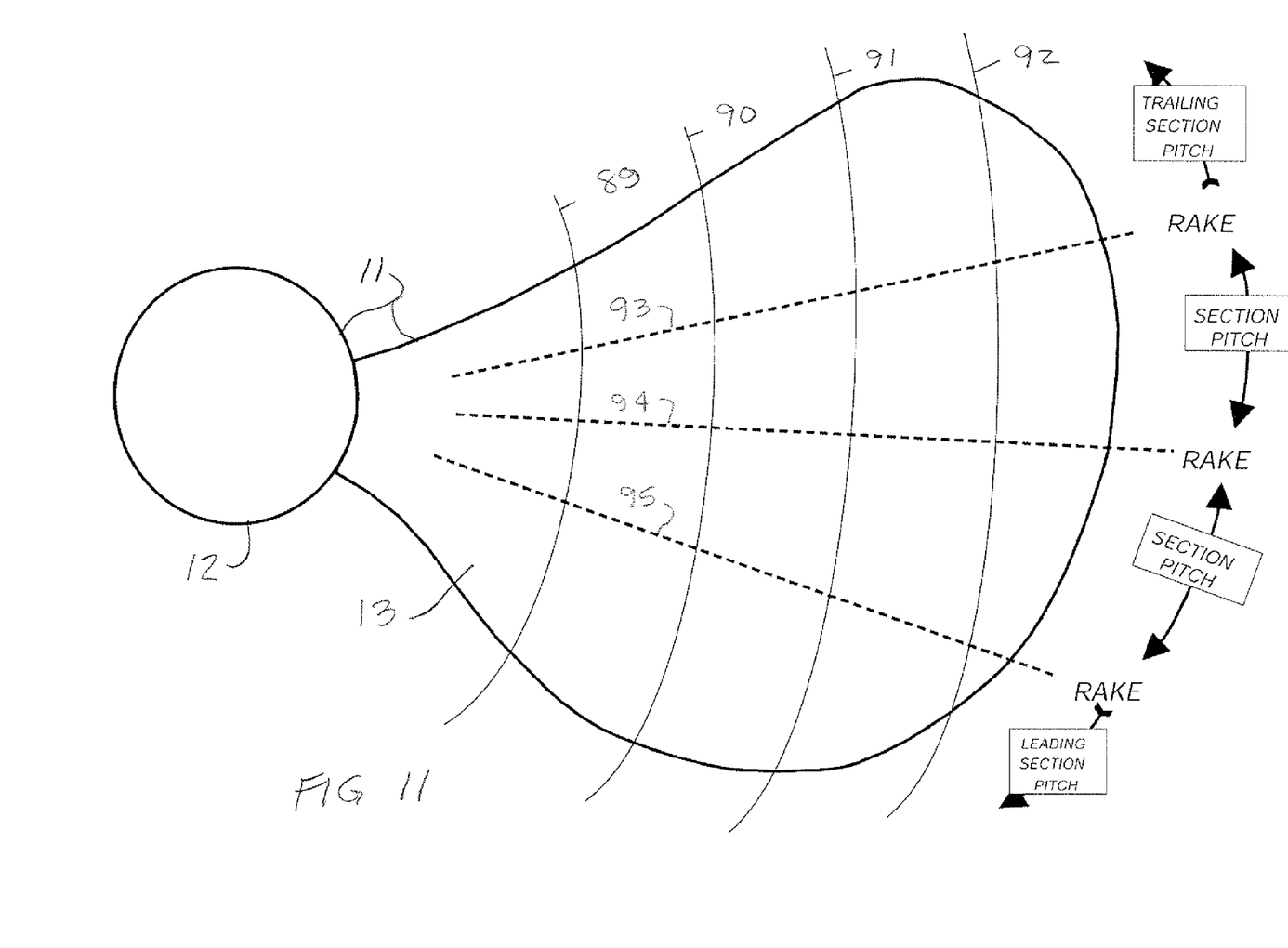
FIG. 11 is a schematic diagram illustrating the method of the present invention.

As part of the method of the present invention, the slide 26 is rotated 360 degrees after the laser displacement sensor 25 is affixed to a selected position along the slide 26. In this fashion, multiple concentric circles (38, 39 in FIG. 3; 89-92 in FIG. 11) can be tracked by the beam 40 as illustrated in FIGS. 3 and 11. A first inner circle 38 in FIG. 3 is illustrated as well as a second outer circle 39. It should be understood however that any number of circles 38, 39 can be generated with the laser displacement sensor 25 when it is positioned at different distances along slide 26 as selected by a user. In FIG. 11, a grid is defined by curved lines 89-92 and radial lines 93-95. The laser sensor 25 measures each blade 13, 14, 15, 16 of propeller 11 in such a grid fashion.

A laser beam 40 is emitted by laser displacement sensor 25 that strikes its target 41 on the propeller blades 13, 14, 15, 16. The laser displacement sensor 25 also provides optical paths 42 that use triangulation to determine the distance between the laser displacement sensor 25 and the target 41.

The present invention provides a method and apparatus for measuring selected parameters relating to a boat propeller using a computer. The apparatus utilizes laser displacement sensor 25 to measure the distance from a laser head to the propeller 11. The laser sensor 25 measures the distance between the laser head and propeller 11 at intervals while being moved along two axes. The first axis is a linear axis (see arrow 30, FIG. 2). The second axis is a curved axis (see arrows 38, 39 in FIG. 3). The linear axis moves the laser from the center of the propeller outward while the curved axis rotates the laser 360 degrees around the propeller 11.

The pitch is defined as the distance a propeller will move in one complete revolution and is displayed in inches. The method and apparatus of the present invention uses a computer to calculate the pitch by recording the distance between two points, done by counting pulses from the encoder on the servomotor in FIG. 2 part number 31. Then using the laser sensor 25 in FIG. 2 the computer will record the distance from the laser to the blade at point number one, then record it at another point number two. Using these recordings, a known calculation can now determine the pitch.

The data also will include the measured rake of a propeller. The rake is defined as the amount a blade is angled or bent in relation to the hub 12 and is displayed in degrees. The method and apparatus of the present invention uses a computer to determine rake by recording from the laser sensor 25 in FIG. 2 the distance from the laser 25 to the blade at a point close to the hub 12. Then those points that are in a straight line out from the hub at this point in each radii scan is then used to determine how much the blade is bent. The computer makes a known calculation to determine rake.

The data will also include the measured squareness of the propeller. The squareness is defined as the distance the blades are separated and is displayed in degrees. The method and apparatus of the present invention uses a computer to determine the squareness by recording from the encoder on the servomotor 31 in FIG. 2 a particular point. Then it will record the same position on the next blade and calculate using these two points the curvature distance between the two points.

International Standard ISO 484/2 (UDC 629.12.037.1: 621.753.1 Ref. No. IS0 484/2-1981 (E)) is incorporated herein by reference, and explains how to calculate the data in the three preceding paragraphs.

Once a new "job" has been created, an operator enters the Auto Scan mode on the computer. The operator is then ready to begin a propeller scan. The operator will start the auto scan by pressing the Start Scan button on the Auto Scan screen. The measuring apparatus 20 will begin by moving the laser out on the linear axis to a first radii position that has been selected. The measuring apparatus 20 will then begin to rotate on the curved axis around the propeller 11. The laser 25 will measure the distance from the laser head to the propeller 11 and a computer can be used to record these parameters as it rotates. Once the curved axis has reached 360 degrees it will reverse on the curved axis and return to its original home position at 0 degrees. Once it has reached 0 degrees or "home position" the linear axis will move the laser head to a different radii position and repeat the process. This process is continued until the laser has moved out to each of the radii positions pre-selected by the operator.

The method and apparatus of the present invention can be computer controlled, using software that is user-friendly enabling easy training of users. Software can be used by an operator to operate the apparatus 10, collect data, and to report that data to a customer. In the computer screen shots of FIGS. 5-10, fields that can be selected from a database using pull down menus. A user can start typing in a selected (e.g. light green) field and selectable information will begin to pop up in the pull down menu. As a user is typing, the information you are looking for comes up simply hit the enter key and that information will be entered in the field. The field that automatically pulls in information from a database and cannot have information typed in is another color, e.g. light gray fields. The field that information can be typed in or sometimes can also be selected from a pull down menu can be e.g. light red fields.

Figure 5:
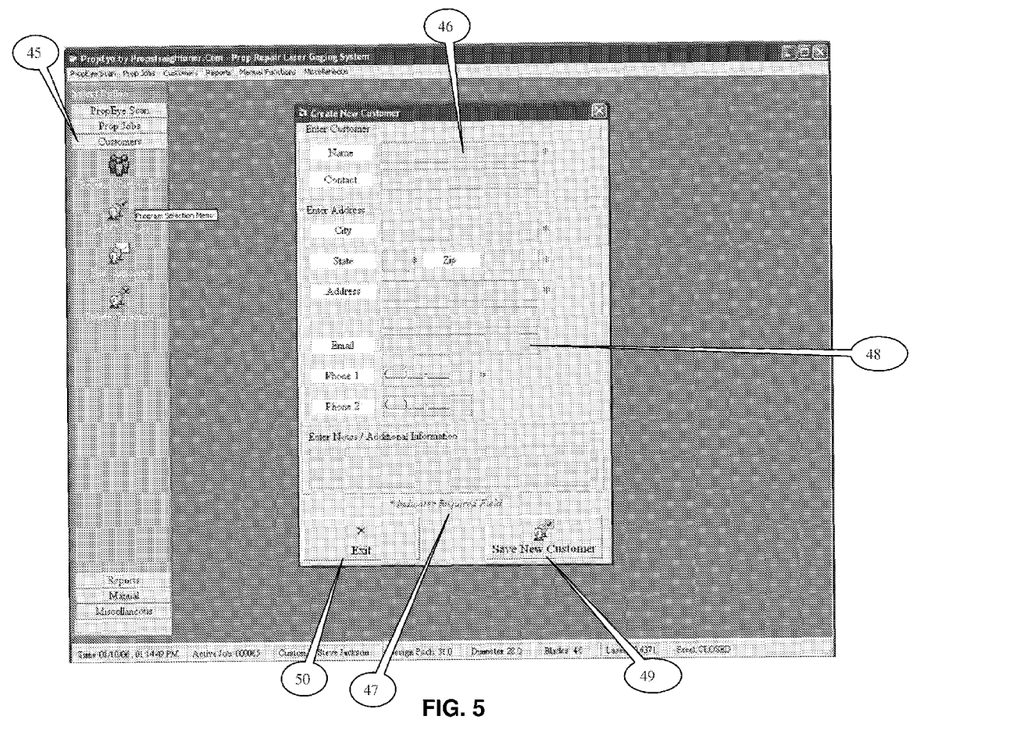
FIGS. 5-10 are screen shots that illustrate the method of the present invention when utilizing a computer to control operation of the apparatus.

To create a new customer, click on the Customer tab 45 in FIG. 5. Under this tab there are four different icons. The first icon is the Browse Customer screen. This screen is used to view customers that have already been added to the database. The second icon is the Add Customer screen. This screen is used to add new customers to the database. The third icon is the Edit Customer screen. This screen is used to change information about a customer that is already in the database. The fourth icon is the Delete Customer screen. This screen is used to delete customers out of the database. These screens under the Customer tab 45 are similar to each other. Following is a review of one of these screens, the Add Customer screen.

Once a user has clicked on the Customer tab 45 then simply click on the Add Customer icon to create a new customer. The screen shown in FIG. 5 will display and a new customer can be entered to the database. Simply click in the text boxes 46 in FIG. 5 and enter the information about the new customer. Notice at the bottom of the screen the note 47 (* Indicates Required Fields) indicated in FIG. 5. Information must be entered in these fields before the software will allow a user to save this customer to the database. At the bottom of the screen indicated in FIG. 5 is a box 48 that will allow entry of any selected personal notes 48 about this customer. This note 48 can be used to enter additional contact information, tax ID number or other desired information. Once the information is entered, a user clicks the Save New Customer 49 button indicated in FIG. 5. To exit the screen simply click the Exit button 50.

Figure 7:
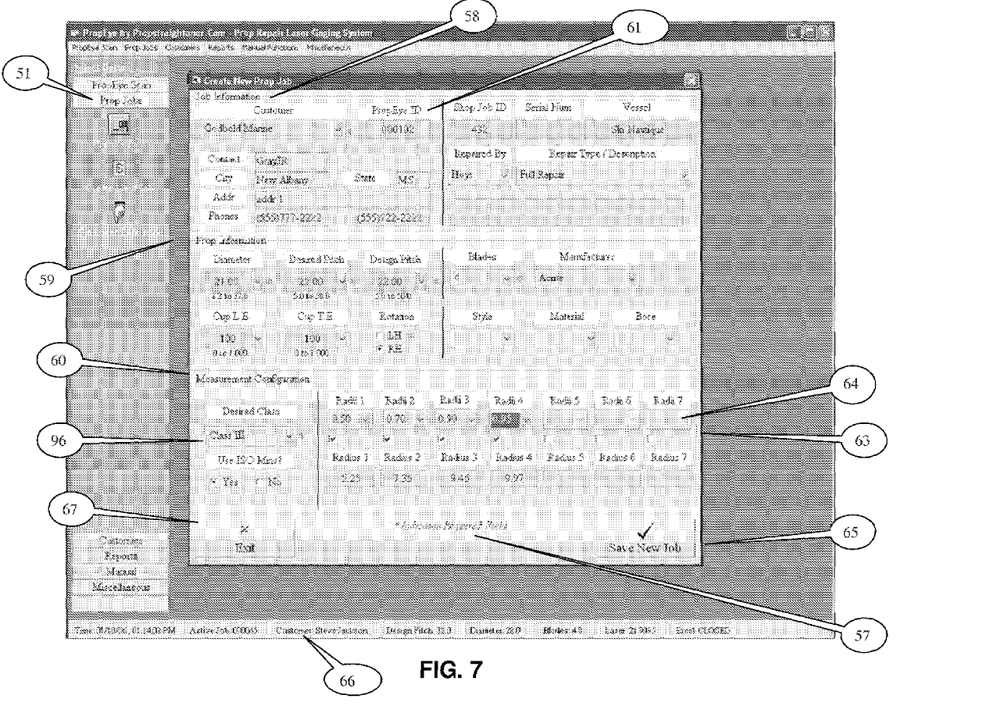

To create a new job, simply click on the Prop Jobs tab 51 in FIG. 7. Once a user has clicked on the Prop Jobs tab 51 a user will notice three different icons. The first icon is the Browse Jobs screen. This screen is used to browse jobs that have already been done and is saved in the database. The second icon is the Create New Job screen. This screen is used to create a new job and prepare the system for auto scan (See Create New Job screen description following). A new job must be created in order to run auto scan, preparing the database and providing a place for the data to be collected and saved. The third icon is the Set Laser Reference screen. This screen is used to set the laser reference to insure accurate readings. This reference should be set only when the apparatus has been set on a new spindle or anytime the distance from the laser and the table below the prop has changed (See Set Laser Reference screen description following).

Figure 6:
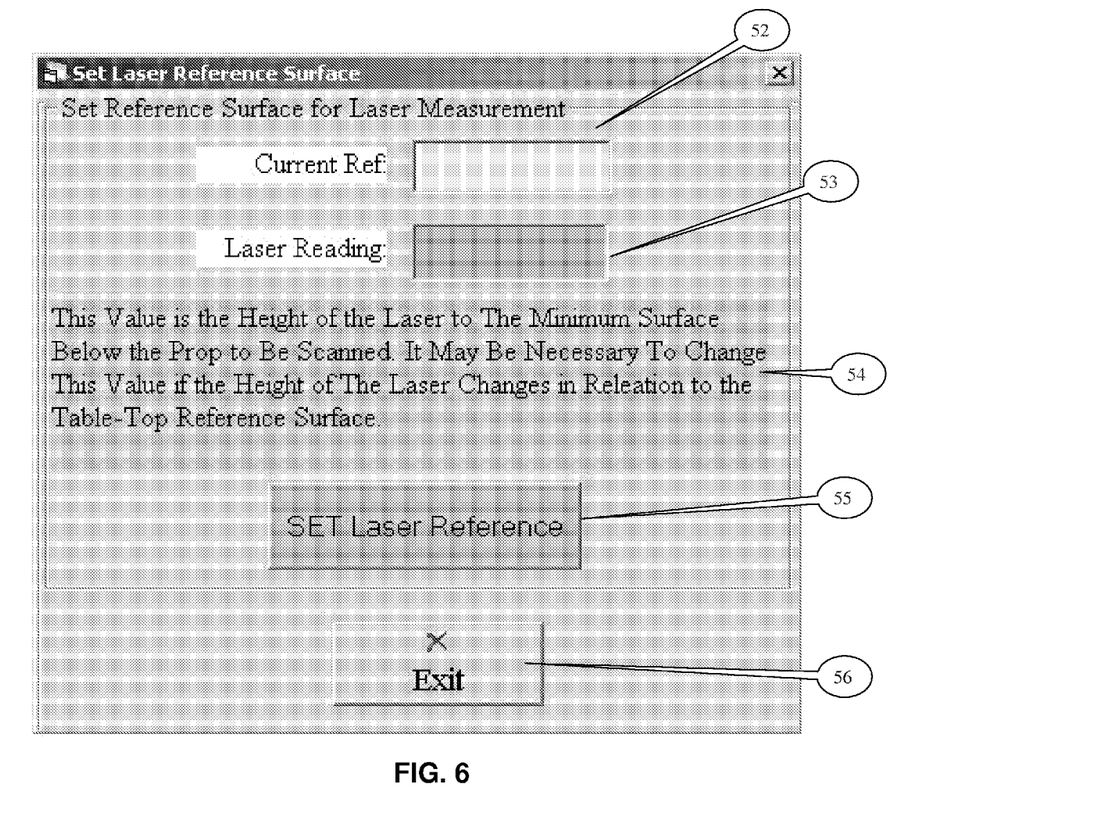

The laser reference is set so that the laser will ignore anything it reads beyond the propeller. First, ensure that the laser is measuring the closest item to the bottom of the propeller. The closest item to the bottom of the propeller can be e.g. a table under the propeller. To move the laser to this location go to the Manual Gage Control screen and turn the rotary motor 31 and traverse slide motor 27 off and pull the laser sensor 25 into location by hand or use the manual controls. Once the laser has been moved into position and a user has clicked the Prop Jobs tab, click the Set Laser Reference icon. The Set Laser Reference Surface screen of FIG. 6 will display. This screen (FIG. 6) shows two indicator boxes. The first box indicated in FIG. 6 is the Current Reference 52 indicator. This indicator 52 will display the last reference set for the laser sensor 25. The second box indicated in FIG. 6 is the Laser Reading indicator 53. This indicator 53 will display the actual reading of the laser and display the note indicated in FIG. 6 as 54.

To set the laser reference simply click the SET Laser Reference button 55 in FIG. 6. When this button is clicked the software will subtract 0.25 inches from what the laser is reading in the Laser Reading indicator box. The system will now ignore anything the laser measures beyond this point. To exit this screen simply click the Exit button 56 in FIG. 6.

Once a user has clicked on the Prop Jobs tab 51, the user can click on the Create New Job icon and the Create New Prop Job screen will display. This screen is used to give the apparatus important information that is needed for auto scans. It prepares the databases and readies the system to collect data for the propeller about to be scanned. Notice at the bottom of the screen the note (* Indicates Required Fields) indicated in FIG. 7 next to note 57. Information must be entered in these fields before the software will allow this job to be saved. This screen has three parts the first of which is the Job Information 58 in FIG. 7. The second part is the Prop Information 59. The third part is the Measurement Configuration 60.

Job in formation 58 is used to enter selected information about the job. When the Customer is selected information such as the customers address, phone number, contact person is automatically pulled in from a database. If the customer you have is not listed then simply exit this screen and go to the Create New Customer screen and add the customer to the list. The software will automatically increment the Prop ID field by one number each time a new job is created. The text box 61 is a field where a user can enter notes in about this job.

Prop Information 59 is used to enter key information about the propeller 11 to be scanned. The diameter of the propeller 11 can be typed in or selected from the pull down menu. If a user does not know the diameter of the propeller, the user exits this screen and goes to the Manual Gage Control screen (FIG. 10) The user manually moves the laser sensor 25 out to the edge of the propeller 11 and read the radius of the propeller 11 from the Traverse Radius indicator box 62. This reading is the radius of the propeller, so multiply this number by two and enter it in the Diameter field (See the description on the Manual Gage Control screen below for more information on moving the laser).

Measurement Configuration 60 is used to enter the measurement configuration for a job. When the desired class is selected the number of radii scans and the position of that radii scan (entered as percentage of the prop diameter) will automatically be entered and is according to the ISO standards for the selected class. Simply clicking the check box under each radii scan to add or take away radii scans can easily change this configuration. The check box is indicated in FIG. 7 as 63. A user can also change the position of the radii scan by simply clicking in the radii scan box 64 and typing in the desired position or selecting it from the pull down menu.

Once all the information has been entered in the three parts of the Create New Prop Job screen the job can be saved by clicking the Save New Job button 65 in FIG. 7. Notice the job information status bar 66 at the bottom of the screen in FIG. 7. This status bar 66 indicates what job has been loaded by the software and is current. This status bar 66 will remain throughout other screens such as the PropEye Auto Prop Scan screen and the Manual Gage Control screen to give a quick indication as to what job is loaded. To exit this screen simply click the Exit button 67 in FIG. 7.

Figure 8:
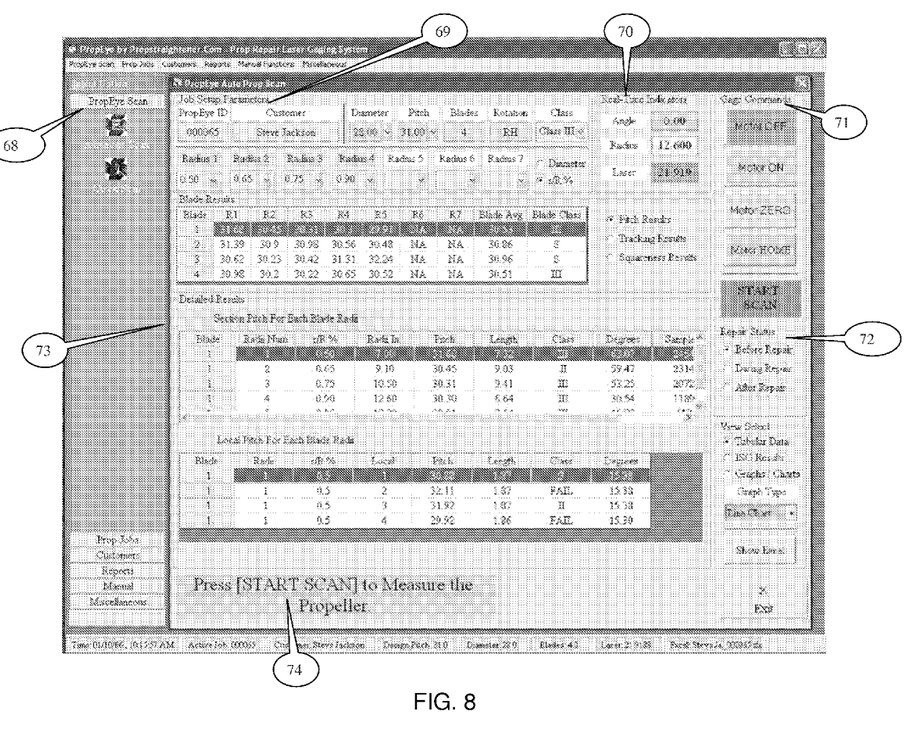

To automatically scan a propeller, simply click on the PropEye Scan tab 68 in FIG. 8. Under this tab you will notice two icons. The first icon is the Automatic Scan screen. This screen is used to do a complete automatic scan of a propeller. This screen is described hereinafter in the PropEye Auto Prop Scan screen description. The second icon is the Quick Scan screen and is used to make quick individual scans of one blade while repairs are being made. This screen will allow a user to make adjustments and then scan what has been adjusted quickly.

Once the PropEye Scan tab 68 has been clicked, a user can display the PropEye Auto Prop Scan screen by clicking the Automatic Scan icon. This screen has six parts. The first is the Job Setup Parameters 69 in FIG. 8 and is used to display and modify the job parameters. The second part is the Real Time Indicators part 70 in FIG. 8. This part 70 displays the current position of the apparatus and what the laser is measuring. The third part is the Gage Commands part 71 in FIG. 8. This part 71 is used to give the operator some control of the apparatus. The fourth part is the Repair Status part 72 in FIG. 8. This part 72 is used to give the operator a way to indicate in the report when this scan was made during the repair process. The fifth part is the Repair Status/Results part 73 in FIG. 8. This part 73 takes up most of the screen and is broken down for easier viewing. The sixth part is the message box 74 in FIG. 8. This part 74 will let the operator know what the machine is currently doing or what it is ready to do.

Job Setup Parameters 69 is used to indicate and modify the job parameters. This part 69 will display information about the current job that has been loaded into the system and is ready to collect data. This information will include the Customer name, ID number and some information about the prop being scanned. Some of this information can be changed. Clicking in the Diameter or Pitch boxes and either typing in the change or selecting it from a pull down menu can change the diameter and pitch values. Clicking the Class box and selecting the desired change from a pull down menu can change the Class value. Clicking in the desired Radius box and either typing or selecting from a pull down menu the radius values can be changed or radiuses can be added or deleted.

Real Time Indicators 70 displays the current position of the apparatus and what the laser sensor 25 is measuring. These displayed values are real time and will give the operator a quick visual as to where the apparatus is located in relation to the propeller 11.

Gage Commands 71 is used to give the operator some control of the apparatus 20. The Motor OFF and Motor ON commands are used to turn the rotator servo motor 31 on and off. By clicking the Motor OFF command the operator can turn the motor 31 off and then rotate the laser sensor 25 around by hand to a desired position then by clicking the Motor ON command the operator can turn the motor 31 back on. This will help the operator to place the laser 25 to a desired position before starting an automatic scan. For example, the laser sensor 25 can be turned off, rotated to a position before a selected blade and then turned on again. Once in the desired position the operator by clicking the Motor ZERO command can zero out the position of the rotator servomotor 31 making this the new home position. The operator by clicking the Motor HOME command can send the laser to the home position. The operator by clicking the START SCAN command can begin an auto scan of the prop.

Repair Status 72 is used to give the operator a way to indicate in the report when this scan was made during the repair process. The report when printed will indicate which of these check boxes was clicked.

Figure 9:
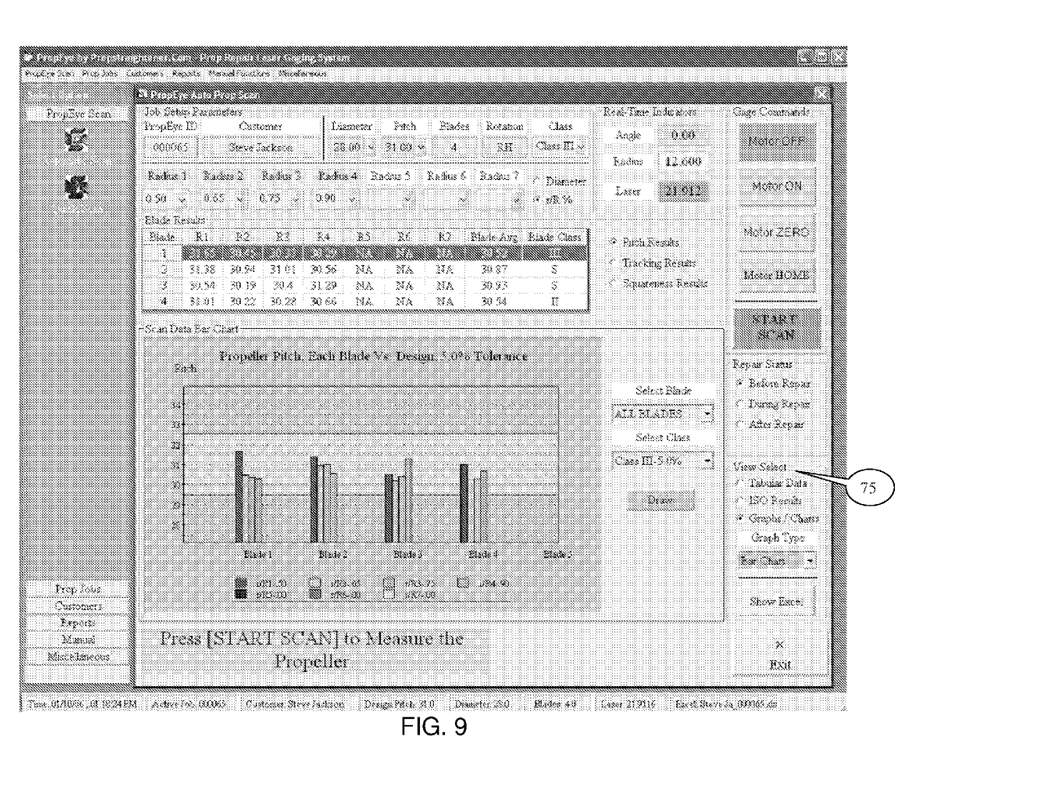

Repair Status/Results 73 takes up most of the screen and is broken down for easier viewing. Clicking the desired display in the View Select 75 part indicated in FIG. 9 can change the results displayed in this part. By clicking the Graphs/Charts box then selecting from a pull down menu by clicking the Graph Type box the display can be changed to display a PolarPlot, BarChart or a LineChart. FIG. 8 is shown displaying Tubular Data as per selected in the View Select part 75. FIG. 9 is shown as displaying a bar chart as per selected in the View Select part indicated in FIGS. 8 and 9 next to note A.

Message Box 74 informs the operator what the machine is currently doing or what it is ready to do. In the displays shown in FIGS. 8 and 9, the message (Press [START SCAN] to Measure the Propeller) is displayed and lets the operator know the system is ready to begin an automatic scan.

Figure 10:
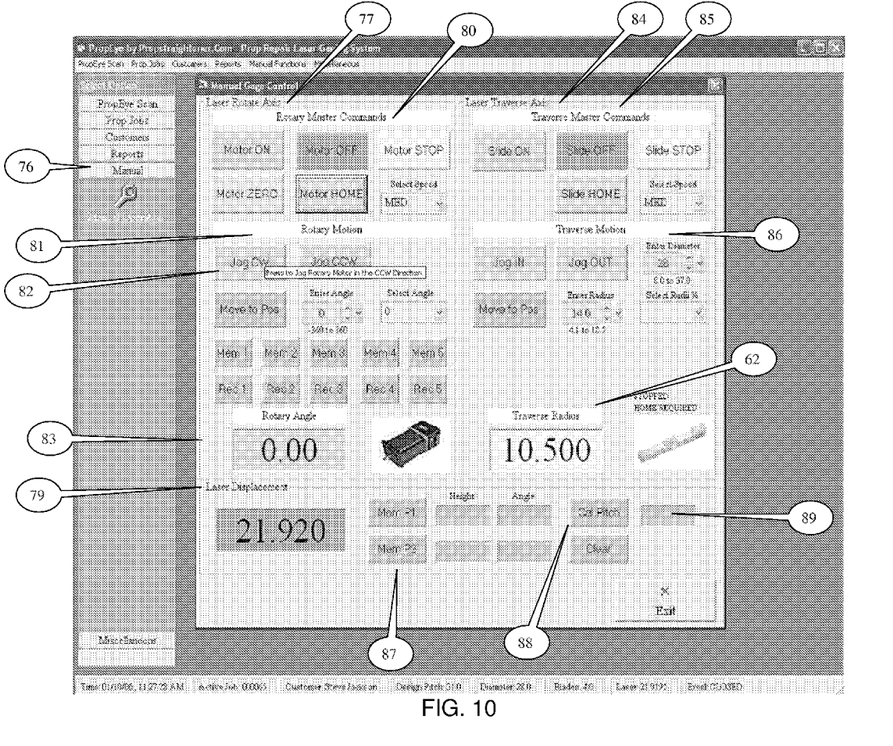

To operate the apparatus 20 manually simply click on the Manual 76 tab in FIG. 10. Under this tab is found the Manual Operation icon. Clicking this icon the Manual Gage Control screen will display. The Manual Gage Control Screen Description screen is broken down into three parts. The first part is the Laser Rotate Axis 77 part in FIG. 10 enabling operator to command the rotary axis of the apparatus 20. The second part is the Laser Traverse Axis 78. The operator to command the traverse slide of the apparatus uses this part. The third part is the Laser Displacement 79 part in FIG. 10. The operator can use the laser value to calculate the pitch between two points using this part of the apparatus.

The Laser Rotate Axis 77 is divided into three parts and is used by the operator to command the rotary axis of the apparatus 20. The Rotary Master Commands part 80 in FIG. 10 is used for the following functions: 1) Motor ON turns the rotary servomotor motor 31 on; 2) Motor OFF turns the rotary servomotor motor 31 off; 3) Motor STOP stops the rotary servomotor 31 when it is in motion; 4) Motor ZERO will zero the position of the rotary servomotor 31 making this position the home position; 5) Motor HOME will cause the rotary servomotor 31 to move to the home position; and 6) Select Speed will allow the operator to change the speed of the rotary servomotor 31 by selecting the speed from a pull down menu.

The Rotary Motion 81 part in FIG. 10 is used for the following functions: 1) Jog CW jogs the rotary servomotor 31 in the clockwise direction; 2) Jog CCW jogs the rotary servomotor 31 in the counterclockwise direction. Notice the hint box 82 over this command indicated in FIG. 10. When the operator places the mouse over a command a hint box giving some description as to what this command does will display; 3) Move to Position will run the rotary servomotor 31 to the position entered in the Enter Angle box or the Select Angle box; 4) Memory commands when clicked will store the position of the rotary servomotor 31. By clicking the Recall command under the Memory commands the rotary servomotor will move to the point that was stored. The operator can record and recall 5 different positions.

The Rotary Angle 83 display indicated in FIG. 10 simply displays the current position of the rotary servomotor.

The Laser Traverse Axis 84 in FIG. 10 is divided into three parts and is used by the operator to command traverse axis of the apparatus. The Traverse Master Commands 85 part is indicated in FIG. 10 is used for the following functions: 1) Slide ON turns the traverse slide motor 27 on; 2) Slide OFF turns the traverse slide motor 27 off; 3) Slide STOP stops the traverse slide motor when it is in motion; 4) Slide HOME will cause the traverse slide motor 27 to move to the home position; and 5) Select Speed will allow the operator to change the speed of the traverse slide 26 by selecting the speed from a pull down menu.

The Traverse Motion 86 part in FIG. 10 is used for the following functions: 1) Jog IN jogs the traverse slide bracket 28 in toward the hub of the propeller 11; 2) Jog OUT jogs the traverse slide bracket 28 out away from the hub 12 of the propeller 11; 3) Enter Diameter box allows the operator to enter or select from a pull down menu the diameter of the propeller 11 being repaired; and 4) Move to Position will run the traverse slide bracket 28 to the position entered in the Enter Radius box or the Select Radii % box.

The Traverse Radius display 62 in FIG. 10 simply displays the current position of the traverse slide 26. The operator can use this display to find the diameter of the prop if it is not known. It is recommended that the operator jog the laser sensor 25 by using the jog commands for the rotary servomotor 31 and traverse slide motor 27 to the edge of the blade 13, 14, 15, 16. The operator can also turn the rotary servomotor 31 and traverse slide motor 27 off and pull the laser sensor 25 out to the edge of the propeller 11 by hand. Once in this position the value is shown in this display. The value in this display is measuring the radius of the propeller 11 so the operator will need to multiply this value by two (2) to achieve the diameter of the propeller 11.

The Laser Displacement 79 in FIG. 10 has a laser measurement display and a quick pitch measurement from two points. The Mem P1 and Mem P2 indicated in FIG. 10 commands 87 are used to store the laser measurement and position of the rotary servomotor 31 between two points. Once these two points was stored in memory then the operator can click on the Cal Pitch in FIG. 10 and the pitch between these two points will be calculated and displayed in the box 89 in FIG. 10. The Clear button when clicked will clear the memory of the two points that has been stored.

The following is a list of parts and materials suitable for use in the present invention.

PARTS LIST

| Part Number | Description |
|---|---|
| 10 | propeller measuring system |
| 11 | propeller |
| 12 | hub |
| 13 | blade |
| 14 | blade |
| 15 | blade |
| 16 | blade |
| 17 | support |
| 18 | conical outer surface |
| 19 | conical socket |
| 20 | apparatus |
| 21 | vertical shaft |
| 22 | conical outer surface |
| 23 | arrow |
| 24 | handle |
| 25 | laser displacement sensor |
| 26 | slide |
| 27 | motor drive |
| 28 | bracket |
| 29 | threaded shaft |
| 30 | arrow |
| 31 | motor drive |
| 32 | gear box |
| 33 | drive shaft |
| 34 | bevel gear |
| 35 | bevel gear |
| 36 | shaft |
| 37 | bearing |
| 38 | first circle |
| 39 | first circle |
| 40 | laser beam |
| 41 | target |
| 42 | optical path |
| 43 | arrow |
| 44 | sleeve |
| 45 | customer |
| 46 | text box |
| 47 | required fields |
| 48 | personal notes |
| 49 | save new customer |
| 50 | exit |
| 51 | prop jobs |
| 52 | current reference |
| 53 | laser reading |
| 54 | note |
| 55 | set laser reference |
| 56 | exit |
| 57 | note |
| 58 | job information |
| 59 | prop information |
| 60 | measurement configuration |
| 61 | text box |
| 62 | traverse radius |
| 63 | check box |
| 64 | radii scan |
| 65 | save new job |
| 66 | job information status bar |
| 67 | exit |
| 68 | propeye scan |
| 69 | job setup parameters |
| 70 | real time indicators |
| 71 | gage commands |
| 72 | repair status |
| 73 | repair status/results |
| 74 | message box |
| 75 | view select part |
| 76 | manual |
| 77 | laser rotate axis |
| 78 | laser traverse axis |
| 79 | laser displacement |
| 80 | rotary master commands |
| 81 | rotary motion |
| 82 | hint box |
| 83 | rotary angle |
| 84 | laser transverse axis |
| 85 | traverse master commands |
| 86 | traverse motion |
| 87 | MEM P1/MEM P2 commands |
| 88 | cal pitch |
| 89 | curved line |
| 90 | curved line |
| 91 | curved line |
| 92 | curved line |
| 93 | radial line |
| 94 | radial line |
| 95 | radial line |
| 96 | selected class |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A method of determining propeller parameters for a boat propeller that has a hub, central axis and a plurality of propeller blades attached to the hub, each blade having a blade surface, comprising the steps of:
   a) providing a laser in close proximity to the propeller, the laser having a laser head;
   b) using the laser to measure distance from the laser head to the propeller blade surface, wherein the laser generates a beam that terminates at the propeller blade surface;
   c) moving the laser in relation to the propeller along either or both of two axis including a first axis that is a linear axis and a second axis that is curved;
   d) using the laser to measure distance from the laser head to the propeller blade surface after step "c";
   e) computing multiple parameters by using the measurements of steps "b" and "d", said parameters selected from the group that includes pitch, rake, and squareness;
   f) wherein the propeller is damaged and further comprising the step of repairing the propeller after step "e"; and
   g) after step "f", repeating steps "b" through "e" to verify that the propeller was properly repaired.

2. The method of claim 1 wherein a computer calculates the parameter in step "d".

3. The method of claim 1 further comprising using an interface between the laser and a computer connected to a computer screen to view data collected during step "b" and displaying the data on the computer screen.

4. The method of claim 1 further comprising providing a computer and a computer screen that displays data collected during step "b" and displaying the data on the computer screen after step "b".

5. The method of claim 1 or 2 or 3 or 4 wherein the computer screen displays input propeller information and further comprising inputting with the computer, propeller information selected from the group: customer information, contact name, telephone number, and address.

6. The method of claim 1 or 2 or 3 or 4 wherein the computer screen displays parameter data collected in step "d".

7. The method of claim 6 wherein the displayed parameter data includes one or more of the following: propeller diameter, propeller manufacturer, propeller bore diameter, propeller material, run identification number, date, desired pitch, desired rake, left/right, aft/fore, +/−values (ISO Standards Class 1, 2, 3, S).

8. A method of determining propeller pitch for a boat propeller that has a hub, central axis and a plurality of circumferentially spaced apart propellers blades attached to the hub and each blade having a blade surface, comprising the steps of:
   a) providing a laser in close proximity to the propeller;
   b) using the laser to measure distance from the laser to each of the propeller blade surfaces, wherein the laser generates a beam that terminates at a propeller blade surface;
   c) wherein step "c" is repeated after moving the laser in relation to the propeller along either or both of two axis including a first axis that is a linear axis and a second axis that is curved;
   d) using the laser to measure distance from the laser to each of the propeller blade surfaces after step "c";
   e) computing the pitch of the propeller using the measurements of steps "b" and "d";
   f) wherein the propeller is damaged and further comprising the step of repairing the propeller after step "e"; and
   g) after step "f", repeating steps "b" through "e" to verify that the propeller was properly repaired.

9. A method of determining propeller rake for a boat propeller that has a hub, central axis and a plurality of propellers attached to the hub, comprising the steps of:
   a) providing a laser in close proximity to the propeller;
   b) using the laser to measure distance from the laser to the propeller blade surface, wherein the laser generates a beam that terminates at the propeller blade surface;
   c) moving the laser in relation to the propeller along either or both of two axis including a first axis that is a linear axis and a second axis that is curved;
   d) using the laser to measure distance from the laser to the propeller blade surface after step "c";
   e) computing the rake of the propeller using the measurements of steps "b" and "d";
   f) wherein the propeller is damaged and further comprising the step of repairing the propeller after step "e"; and
   g) after step "f", repeating steps "b" through "e" to verify that the propeller was properly repaired.

10. A method of determining propeller pitch for a propeller that has a hub, central axis and a plurality of propellers having blade surfaces attached to the hub, comprising the steps of:
    a) providing a laser in close proximity to the propeller;
    b) using the laser to measure distance from the laser to each propeller blade surface, wherein the laser generates a beam that terminates at the propeller blade surface;
    c) moving the laser in relation to the propeller along either or both of two axis including a first axis that is a linear axis and a second axis that is curved;
    d) using the laser to measure distance from the laser to each of the propeller blade surfaces after step "c";
    e) computing the pitch of the propeller using the measurements of steps "b" and "d";
    f) wherein the propeller is damaged and further comprising the step of repairing the propeller after step "e"; and
    g) after step "f", repeating steps "b" through "e" to verify that the propeller was properly repaired.

11. A method of determining propeller parameters for a propeller that has a hub, central axis and a plurality of propeller blades with blade surfaces attached to the hub, comprising the steps of:
    a) providing a laser in close proximity to the propeller;
    b) using the laser to measure distance from the laser to the propeller blade surface, wherein the laser generates a beam that terminates at the propeller blade surface;
    c) moving the laser in relation to each propeller blade along two axes including a first axis that is a linear axis and a second axis that is curved;
    d) using the laser to measure distance from the laser to the propeller blade surface after step "c";
    e) computing a parameter by using the measurements of steps "b" and "d", said parameters selected from the group that includes pitch, rake, and squareness; and
    f) wherein the propeller is damaged and further comprising the step of repairing the propeller after step "e"; and
    g) after step "f", repeating steps "b" through "e" to verify that the propeller was properly repaired.

12. A method of determining propeller parameters for a boat propeller that has a hub, central axis and a plurality of propeller blades attached to the hub, comprising the steps of:

a) providing a laser displacement sensor in close proximity to the propeller, the laser displacement sensor having a laser head that emits a laser beam;
b) using the laser displacement sensor to measure distance from the laser head to the propeller blade surface, wherein the laser generates a beam that terminates at the propeller blade surface;
c) moving the laser beam in relation to the propeller;
d) using the laser to measure distance from the laser to the propeller blade surface after step "c";
e) computing a selected parameter by using the measurements of steps "b" and "d", said parameter selected from the group that includes pitch and rake;
f) wherein the propeller is damaged and further comprising the step of repairing the propeller after step "e"; and
g) after step "f", repeating steps "b" through "e" to verify that the propeller was properly repaired.

13. The method of claim 1 wherein a computer calculates the parameter in step "d".

14. The method of claim 1 further comprising using an interface between the laser and a computer connected to a computer screen to view data collected during step "b" and displaying the data on the computer screen.

15. The method of claim 1 further comprising providing a computer and a computer screen that displays data collected during step "b" and displaying the data on the computer screen after step "b".

16. The method of claim 2 wherein a computer screen displays input propeller information and further comprising inputting with the computer, propeller information selected from the group: customer information, contact name, telephone number, and address.

17. The method of claim 2 wherein the computer screen displays parameter data collected in step "d".

18. The method of claim 6 wherein the displayed parameter data includes one or more of the following: propeller diameter, propeller manufacturer, propeller bore diameter, propeller material, run identification number, date, desired pitch, desired rake, left/right, aft/fore, +/–values.

19. A method of determining propeller pitch for a boat propeller that has a hub, central axis and a plurality of propellers attached to the hub, comprising the steps of:
a) providing a laser displacement sensor in proximity to the propeller, the sensor having a laser that generates a laser beam;
b) using the laser sensor to measure distance from the laser to the propeller blade surface, wherein the laser generates a beam that terminates at the propeller blade surface;
c) moving the laser in relation to the propeller;
d) using the laser to measure distance from the laser to the propeller blade surface after step "c";
e) computing the pitch of the propeller using the measurements of steps "b" and "d";
f) wherein the propeller is damaged and further comprising the step of repairing the propeller after step "e"; and
g) after step "f", repeating steps "b" through "e" to verify that the propeller was properly repaired.

20. A method of determining propeller rake for a boat propeller that has a hub, central axis and a plurality of propellers attached to the hub, comprising the steps of:

a) providing a laser displacement sensor in proximity to the propeller, the sensor having a laser that generates a laser beam;
b) using the laser sensor to measure distance from the laser to the propeller blade surface, wherein the laser generates a beam that terminates at the propeller blade surface;
c) wherein step "c" is repeated after moving the laser in relation to the propeller;
d) using the laser to measure distance from the laser to the propeller blade surface after step "c";
e) computing the rake of the propeller using the measurements of steps "b" and "d";
f) wherein the propeller is damaged and further comprising the step of repairing the propeller after step "e"; and
g) after step "f", repeating steps "b" through "e" to verify that the propeller was properly repaired.

21. A method of determining propeller pitch for a propeller that has a hub, central axis and a plurality of propellers attached to the hub, comprising the steps of:
a) providing a laser in close proximity to the propeller;
b) using the laser to measure distance from the laser to the propeller blade surface, wherein the laser generates a beam that terminates at the propeller blade surface;
c) moving the laser in relation to the propeller along either or both of two axis including a first axis that is a linear axis and a second axis that is curved;
d) using the laser to measure distance from the laser to the propeller blade surface after step "c";
e) computing the pitch of the propeller using the measurements of steps "b" and "d";
f) wherein the propeller is damaged and further comprising the step of repairing the propeller after step "e"; and
g) after step "f", repeating steps "b" through "e" to verify that the propeller was properly repaired.

22. A method of determining propeller parameters for a propeller that has a hub, central axis and a plurality of propellers attached to the hub, comprising the steps of:
a) providing a laser displacement sensor in proximity to the propeller, the laser sensor having a laser that generates a laser beam;
b) using the laser sensor to measure distance from the laser to the propeller blade surface, wherein the laser generates a beam that terminates at the propeller blade surface;
c) moving the laser in relation to the propeller along either or both of two axis including a first axis that is a linear axis and a second axis that is curved;
d) using the laser to measure distance from the laser to the propeller blade surface after step "c";
e) computing a parameter by using the measurements of steps "b" and "d", said parameters selected from the group that includes pitch, rake, and squareness;
f) wherein the propeller is damaged and further comprising the step of repairing the propeller after step "e"; and
g) after step "f", repeating steps "b" through "e"; to verify that the propeller was properly repaired.

* * * * *